United States Patent [19]

Matsumoto

[11] Patent Number: 5,812,944
[45] Date of Patent: Sep. 22, 1998

[54] MOBILE SPEECH LEVEL REDUCTION CIRCUIT RESPONSIVE TO BASE TRANSMITTED SIGNAL

[75] Inventor: Kouichi Matsumoto, Tokyo, Japan

[73] Assignee: NEC Corporation, Tokyo, Japan

[21] Appl. No.: 507,839

[22] Filed: Jul. 27, 1995

[30] Foreign Application Priority Data

Jul. 27, 1994 [JP] Japan .................................. 6-175277

[51] Int. Cl.⁶ .................................................. H04M 11/00
[52] U.S. Cl. ....................... 455/403; 455/570; 455/278; 455/282; 379/410; 379/406
[58] Field of Search ................... 455/33.1, 38.3, 455/116, 127, 54.1, 423, 451, 570, 278, 282; 379/58, 59, 410, 406, 345, 24, 5, 3; 370/95.3

[56] References Cited

U.S. PATENT DOCUMENTS

| | | | |
|---|---|---|---|
| 5,111,454 | 5/1992 | Hung et al. | 370/95.3 |
| 5,515,397 | 5/1996 | Wiorek | 379/58 |
| 5,553,137 | 9/1996 | Nyhart et al. | 379/58 |
| 5,559,881 | 9/1996 | Sih | 379/410 |
| 5,592,548 | 1/1997 | Sih | 379/410 |

*Primary Examiner*—Dwayne Bost
*Assistant Examiner*—Keith Ferguson
*Attorney, Agent, or Firm*—Sughrue, Mion, Zinn, Macpeak & Seas, PLLC

[57] ABSTRACT

In a mobile radio communication system where a base station is connected to a public switched telephone network, a hybrid unit and an echo canceler are provided in the base station. A mobile radiotelephone unit receives a base-to-mobile coded speech signal from the base station on a downlink channel and transmits a mobile-to-base coded speech signal on an uplink channel. In order to avoid the interruption of a base-to-mobile speech signal at the echo canceler which would occur as a result of a delayed, high-amplitude mobile-to-base analog speech signal, the mobile unit compares the energy parameter of the mobile-to-base coded speech signal and the energy parameter of the base-to-mobile coded speech signal, determines the difference therebetween when the former is higher than the latter, and reduces the energy parameter of the mobile-to-base speech signal by an amount corresponding to the difference.

11 Claims, 1 Drawing Sheet

MOBILE SPEECH LEVEL REDUCTION CIRCUIT RESPONSIVE TO BASE TRANSMITTED SIGNAL

BACKGROUND OF THE INVENTON

1. Field of the Invention

The present invention relates to generally cellular mobile communications systems, and specifically to a digital mobile radiotelephone unit for communication with a cell-site base station equipped with echo cancelers.

2. Description of the Related Art

In a digital cellular mobile communication system, a communication path established by a base station between a mobile station and a network user station includes an echo canceler which is provided at the base station for canceling talker's speech energy leaked through a hybrid unit that connects the four-wire section of the communication path to its two-wire section. If the echo canceler is not properly functioning, the leaked energy would produce the effect of an echo on the talker at the mobile station. Since the digital speech processing circuitry employed in the mobile and the base stations introduces a substantial amount of delays, an echo would be heard at the talker typically 80 milliseconds after the utterance, giving an unpleasant impression. Because of the substantial amount of delays, the synthetic echo replica generated in response to a given mobile-to-base (uplink) signal by the echo canceler is delayed to such an extent that it encounters a base-to-mobile (downlink) signal. If the amplitude of the given uplink signal is high, the echo estimation loop gain of the canceler would be too high for a low-amplitude, base-to-mobile speech sample which may be encountered, causing it to be chopped.

In order to obviate this problem, a fixed amount of loss is currently inserted at the mobile station so that the speech level of the mobile-transmitted signal is reduced by a predetermined amount, regardless of the speech level of the base-to-mobile signal.

However, difficulty arises to appropriately determine the insertion loss because it is necessary to compromise between the level of signal at the network user station which must be sufficiently high to ensure smooth conversation and the liked of speech interruptions at the mobile station which must be as low as possible.

SUMMARY OF THE INVENTION

It is therefore an object of the present invention to provide a digital mobile radiotelephone unit capable of preventing the speech interruptions of base-to-mobile speech signal at the digital mobile radiotelephone unit.

According to the present invention, the inventive digital mobile radiotelephone unit is adapted for communication with abase station having a hybrid unit connected between a two-wire circuit and a four-wire circuit, and an echo canceler for canceling an echo of an analog speech signal leaked through the hybrid unit. On a downlink channel, the mobile radiotelephone unit receives a base-to-mobile coded speech signal. A speech coding circuit encodes a mobile-to-base speech signal into a coded speech signal which is transmitted on an uplink channel to the base station, and a speech decoding circuit decodes the received base-to-mobile coded speech signal into a decoded speech signal. The mobile-to-base coded speech signal is compared with the received coded speech signal, a difference in magnitude therebetween is determined when the mobile-to-base coded signal is higher than the base-to-mobile coded signal and the magnitude of the coded mobile-to-base speech signal is reduced by an amount corresponding to the difference.

According to a specific aspect, the coded speech signal at each of the mobile and base stations contains an energy parameter as well as speech parameters. For precision control, the mobile unit compares the energy parameter of the mobile-to-base speech signal with the energy parameter of the received base-to-mobile encoded speech signal and a difference therebetween is determined. The magnitude of the energy parameter of the mobile-to-base speech signal is reduced by an amount corresponding to the difference.

BRIEF DESCRIPTION OF THE DRAWINGS

The present invention will be described in furher detail with reference to the accompanying drawings, in which.

DETAILED DESCRIPTION

Figures 1, 2:
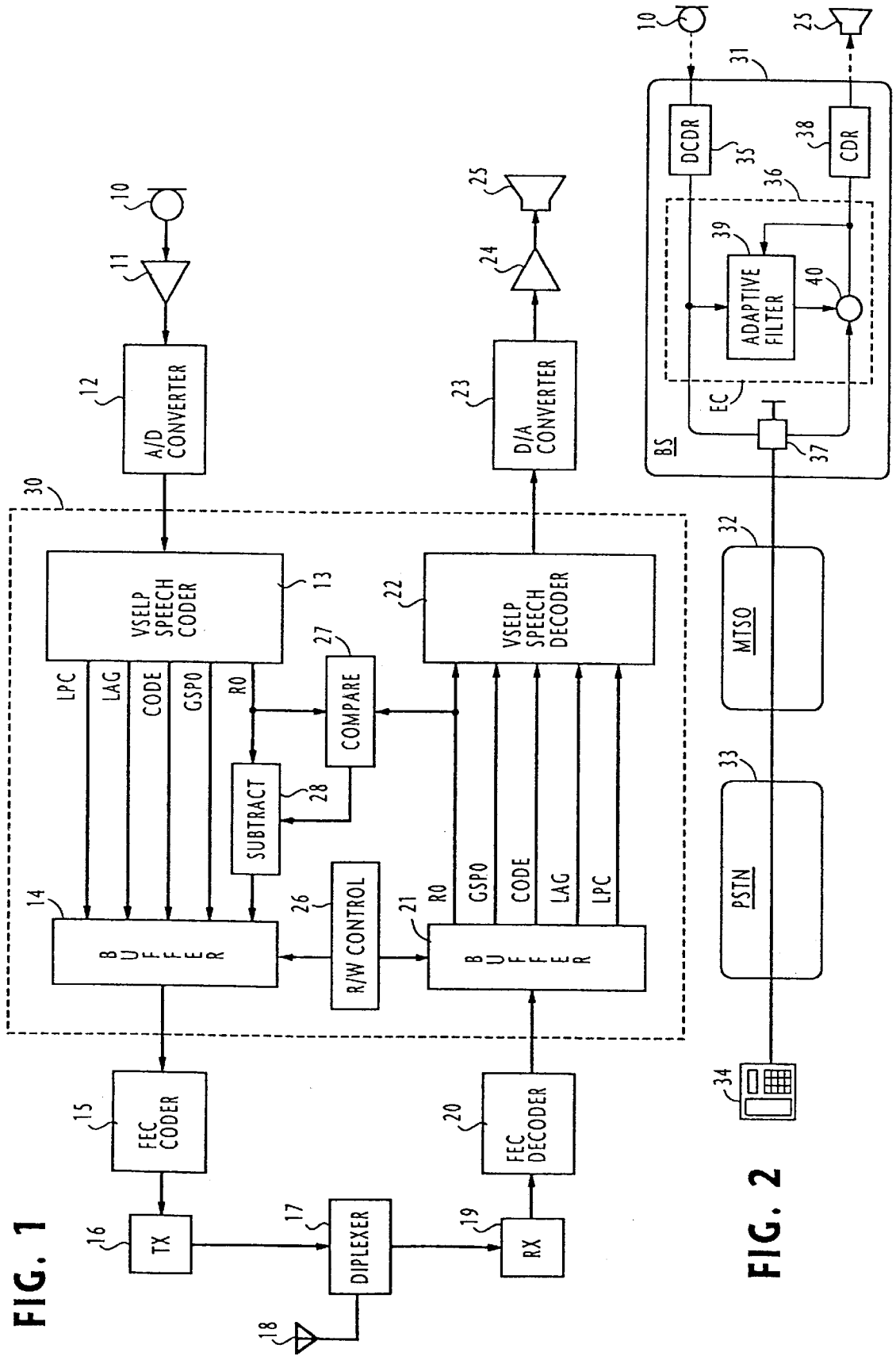
FIG. 1 is a block diagram of a mobile radiotelephone unit according to the present invention.
FIG. 2 is a schematic diagram of a network of communication paths through a base-station echo canceler.

Referring now to FIG. 1, there is shown a mobile radiotelephone unit (simply a mobile unit) according to the present invention for use in a digital mobile cellular communication system. In the mobile unit, talker's voice is detected by microphone 10, amplified by amplifier 11 and converted to a 64-kbps digital signal by A/D converter 12 using the standard 8-kHz sampling and 8-bit-per-sample quantization technique. The digital signal is input to a VSELP (vector sum excited linear prediction) speech coder 13 where the signal is converted to a low-bit rate signal, typically 7.95-kbps according to the EIA/TIA Interim Standard (Cellular System Dual-Mode Mobile Station-Base Station Compatibility Standard) IS-54-B. This standard specifies a speech coding algorithm based on the linear predictive coding (LPC) method which is a member of a class of speech coders known as code excited linear predictive coding (CELP), stochastic coding, or vector excited speech coding. With these techniques code books are used to vector-quantize the excitation (residual) signal. Speech coder 13 analyzes the input speech samples and produces 159 bits per 20-ms speech frame. These 159 bits include 38 bits of short-term filter (LPC) coefficients, 5 bits of frame energy (R0), 28 bits of long term filter coefficients (lag), 56 bits of, codebook codes, and 32 bits of gain codes GSP0. The outputs of speech coder 13, except for the energy parameter R0, are stored directly into respective locations of a transmit buffer 14, while the energy parameter is applied to the buffer 14 after passing through a subtractor 28. The contents of transmit buffer 14 are read out frame-by-frame into a forward error correction (FEC) coder 15 where each frame is converted to a convolutional code and fed to a mobile transmitter 16. In the mobile transmitter 16, the convolutional code is modulated on an uplink carrier and transmitted via diplexer 17 from antenna 18 in burst form to a base station.

At the base station, the speech signal from a network user station is passed through an echo canceler and encoded with 159 bits of VSELP parameters in the same manner as in the mobile unit, converted to a convolutional code, and modulated on a downlink carrier burst for transmission to the mobile unit. The downlink burst is received on antenna 18, converted in a mobile receiver 19 to the original convolutional code sequence, and applied to a FEC decoder 20 for error detection and correction using the known Viterbi decoding algorithm The output of FEC decoder 20 is entered frame-by-frame into a receive buffer 21 where it is separated into the individual speech parameters and stored in respective locations of the buffer 21, and individually read and supplied to a VSELP speech decoder 22. By using the outputs of the buffer 21, the speech decoder 22 reconstructs the original 64-kbps PCM signal, which is converted to analog form by a D/A converter 23, and amplified by amplifier 24 to drive a loudspeaker 25.

The read/write timing and address control of the transmit and receive buffers 14 and 21 is provided by a read/write controller 26 so that all parameter bits of the transmit and receive frames are stored into and read out of predetermined storage locations of the respective buffers.

At the mobile station, a comparator 27 is provided for making a comparison between the transmit energy R0 and the receive energy R0. Before each frame is read out of the transmit buffer 14, the 5-bit frame energy value R0 of the frame is compared with the 5-bit frame energy value R0 of a receive frame. If the transmit energy parameter is higher than the receive energy parameter, the comparator 27 computes the difference between them and supplies the difference value to the subtractor 28. In the subtractor 28, this difference value is subtracted from the transmit R0 parameter. Thus, both transmit and receive frame energy parameters R0 are made equal to each other only when the mobile-transmitted signal is stronger than the base-to-mobile signal.

The frame energy value R0 of a speech signal reflects the average signal power (mean square value) of the input speech over a 20ms interval. According to the TIA/EIA standard, R0 is computed during the computation of the short term LPC parameters, converted into dB relative to full scale (which is defined as the square of the maximum sample amplitude), quantized to 32 levels and encoded with five bits once per frame. A code of zero for R0 corresponds to an energy of 0 which is used to totally silence the speech decoder. Therefore, the speech levels of both transmit and receive circuits of the mobile unit are controlled to a degree of precision not attainable with analog circuit In a practical aspect, all blocks of the electronic circuitry enclosed in a dotted line 30 are implemented by a digital signal processor including a read-only memory storing a software program. Therefore, the comparator and subtractor are implemented with software-driven comparison and subtraction processes.

As illustrated in FIG. 2, the mobile transmitted signal is received by a base station 31 which is connected through a mobile telephone switching office (MTSO) 32 and a public switched telephone network (PSTN) 33 to a network user station 34. After radio-to-baseband frequency translation, the mobile-transmitted baseband digital signal is applied to decoding circuitry 35 where FEC decoding, VSELP decoding and D/A conversion processes are sequentially performed to recover the original analog speech signal. The mobile-transmitted analog signal is passed through the uplink path of an echo canceler 36 to the input terminal the four-wire section of a hybrid unit 37. The two-wire section of the hybrid unit is connected to the MTSO 32. Via the PSTN and MTSO, the signal from user station 34 appears at the output terminal of the four-wire section of the hybrid 37 and is transmitted through the downlink path of the echo canceler 36 to coding circuitry 38 where A/D conversion, VSELP coding and FEC coding processes are sequentially performed to produce an 8-kbps signal, which is transmitted to the mobile unit after being modulated on a downlink carrier.

Echo canceler 36 includes an adaptive filter 39 for generating a synthetic replica of an echo and a subtractor 40 for subtracting the replica from an echo that is leaked through the hybrid unit 37. In the adaptive filter 39, the echo synthesis is based on a closed-loop estimation process by using the output of the subtractor 40.

If the conventional fixed attenuation scheme is employed at the mobile unit and the mobile speech level is high, a high amplitude, delayed analog speech sample would appear at the input of the adaptive filter 39 at the instant a low amplitude, base-to-mobile speech sample appears at the output terminal of the four-wire section of the hybrid 37, and the loop gain of the filter 39 would be such that it excessively attenuates the base-to-mobile signal.

However, as a result of the energy equalizing operation at the mobile unit, the energy level of the mobile-to-base signal is adaptively reduced in relation to the energy level of the base-to-mobile signal only when the former is higher than the latter, and hence, the amplitude of the signal in the uplink path of echo canceler 32 no longer exceeds the critical level at which the chopping of the base-to-mobile signal occurs.

What is claimed is:

1. A digital mobile radiotelephone unit for communicating with a base station having a hybrid unit connected between a two-wire circuit and a four-wire circuit, and an echo canceler for canceling an echo of an analog speech signal leaked through the hybrid unit, comprising:

means for establishing a downlink channel with the base station for receiving a base-to-mobile coded speech signal;

a speech coding circuit for encoding a mobile-to-base speech signal into a coded speech signal;

means for establishing an uplink channel with the base station for transmitting the mobile-to-base coded speech signal on the uplink channel;

a speech decoding circuit for decoding the received base-to-mobile encoded speech signal into a decoded speech signal;

means for comparing the mobile-to-base coded speech signal with the received base-to-mobile coded speech signal and determining a difference in magnitude therebetween when the magnitude of the mobile-to-base coded speech signal is higher than the magnitude of the received base-to-mobile coded speech signal; and means for reducing the magnitude of the coded mobile-to-base speech signal by an amount corresponding to the difference detected by the comparing means.

2. A digital mobile radiotelephone unit for communicating with a base station having a hybrid unit connected between a two-wire circuit and a four-wire circuit, and an echo canceler for canceling an echo of an analog speech signal leaked through the hybrid unit, comprising:

means for establishing a downlink channel with the base station for receiving a base-to-mobile encoded speech signal which is represented by speech parameters and an energy parameter;

a speech coding circuit for encoding a mobile-to-base analog speech signal into speech parameters and an energy parameter;

means for establishing an uplink channel with the base station for transmitting the encoded mobile-to-base speech signal on the uplink channel;

means for comparing the energy parameter of the mobile-to-base. speech signal with an energy parameter of the received base-to-mobile encoded speech signal and determining a difference in magnitude between the energy parameters of the mobile-to-base signal and the base-to-mobile signal when the magnitude of the energy parameter signal of the mobile-to-base speech signal is higher than the magnitude of the energy parameter signal of the received base-to-mobile signal;

means for reducing the magnitude of the energy parameter of the mobile-to-base speech signal by an amount corresponding to the difference detected by the comparing means; and a speech decoding circuit for decoding the received base-to-mobile encoded speech signal into a decoded speech signal.

3. A mobile radiotelephone unit as claimed in claim 2, wherein said speech coding circuit and said speech decoding circuit comprise vector sum excited linear prediction (VSELP) speech coder and decoder, respectively.

4. A digital mobile radiotelephone unit for communicating with a base station, comprising:

a speech coding circuit for encoding a mobile-to-base speech signal into a coded mobile-to-base speech signal;

means for comparing the mobile-to-base coded speech signal with a received base-to-mobile coded speech signal and determining a difference in magnitude therebetween when the magnitude of the mobile-to-base coded speech signal is higher than the magnitude of the received base-to-mobile coded speech signal; and means for reducing the magnitude of the coded mobile-to-base speech signal by an amount corresponding to the difference detected by the comparing means.

5. A mobile radiotelephone unit for communicating with a base station as claimed in claim 4, wherein said mobile radiotelephone unit eliminates chopping of the base-to-mobile signal that results when said mobile radiotelephone unit is used for communicating with a base station having a hybrid unit connected between a two-wire circuit and a four-wire circuit, and an echo canceler for canceling an echo of an analog speech signal leaked through the hybrid unit.

6. A mobile radiotelephone unit for communicating with a base station as claimed in claim 5, wherein said coded mobile-to-base speech signal and said received base-to-mobile coded speech signal includes speech parameters and energy parameters, and said difference in said magnitude being determined as a difference between said energy parameter of said coded mobile-to-base signal and said energy parameter of said received base-to-mobile coded speech signal.

7. A mobile radiotelephone unit for communicating with a base station as claimed in claim 6, wherein said energy parameters are a 5-bit frame energy value.

8. A mobile radiotelephone unit for communicating with a base station as claimed in claim 7, wherein said means for comparing and means for reducing are internal to a digital signal processor which includes a read-only memory, and are software-driven comparison and subtraction processes.

9. A mobile radiotelephone unit for communicating with a base station as claimed in claim 7, further comprising:

means for establishing a downlink channel with the base station for receiving said base-to-mobile coded speech signal;

means for establishing an uplink channel with the base station for transmitting the mobile-to-base coded speech signal on the uplink channel; and a speech decoding circuit for decoding the received base-to-mobile encoded speech signal into a decoded speech signal.

10. A mobile radiotelephone unit for communicating with a base station as claimed in claim 9, wherein said speech coding circuit and said speech decoding circuit comprise vector sum excited linear prediction (VSELP) speech coder and decoder, respectively.

11. A mobile radiotelephone unit for communicating with a base station as claimed in claim 10, wherein said speech coding circuit, said speech decoding circuit, said means for comparing and means for reducing are internal to a digital signal processor which includes a read-only memory, and said means for comparing and means for reducing are software-driven comparison and subtraction processes.

* * * * *

UNITED STATES PATENT AND TRADEMARK OFFICE
CERTIFICATE OF CORRECTION

PATENT NO. : 5,812,944

DATED : September 22, 1998

INVENTOR(S) : WILLIAM GEORGE IMLAH

Page 1 of 4

It is certified that error appears in the above-identified patent and that said Letters Patent is hereby corrected as shown below:

Item [30] Foreign Application Priority Data, "9310410" should read --9310410.7--.

Item [56] References Cited, OTHER PUBLICATIONS, under Thirunarayan, "cybernatics" should read --cybernetics--.

In the Drawings:

SHEET 25

Figure 24, "LTU3" should read --LUT3--.

COLUMN 1

Line 10, "Infor-" should read --infor- --.

COLUMN 4

Line 11, "A4,2)" should read --(A4,2)--.
Line 45, "condition ie." should read --condition, i.e.--.

COLUMN 7

Line 16, "photocorrectly" should read --photocopier 10--.
Line 38, "(x))))" should read --(x))--.

COLUMN 12

Line 1, "recovery" should read --recovery- --.

UNITED STATES PATENT AND TRADEMARK OFFICE
CERTIFICATE OF CORRECTION

PATENT NO. : 5,812,944

DATED : September 22, 1998

INVENTOR(S) : WILLIAM GEORGE IMLAH

It is certified that error appears in the above-identified patent and that said Letters Patent is hereby corrected as shown below:

COLUMN 13

Line 42, "clear" should read --is clear--.

COLUMN 14

Line 15, "hypothesised" should read --hypothesise--.

COLUMN 20

Line 2, "hypothesised" should read --hypothesise--.

COLUMN 22

Line 4, "fact" should read --fact to--.

COLUMN 24

Line 32, "a includes a negative" should read --any particular time--.

COLUMN 25

Line 11, "solution being," should read --solution being found,--.
Line 14, "to return" should read --return to--.
Line 26, "return" should read --return to--.
Line 62, "removed" should read --be removed--.

UNITED STATES PATENT AND TRADEMARK OFFICE
CERTIFICATE OF CORRECTION

PATENT NO. :

5,812,944

DATED : September 22, 1998

INVENTOR(S) :

WILLIAM GEORGE IMLAH

It is certified that error appears in the above-identified patent and that said Letters Patent is hereby corrected as shown below:

COLUMN 38

Line 40, "eg." should read --e.g.,--.

COLUMN 39

Line 65, "anfailurus" should read --and status--.

COLUMN 47

Line 25, "esised" should read --esise--.
    Line 33, "hypothesised" should read --hypothesise--.
    Line 37, "esised" should read --esise--.
    Line 51, "ie." should read --i.e.,--.

COLUMN 48

Line 51, "ie." should read --i.e.,--.

COLUMN 51

Line 6, "hard wired" should read --hard-wired--.
    Line 8, "hard wired" should read --hard-wired--.

UNITED STATES PATENT AND TRADEMARK OFFICE
CERTIFICATE OF CORRECTION

PATENT NO. : 5,812,944

DATED      : September 22, 1998

INVENTOR(S) : WILLIAM GEORGE IMLAH

It is certified that error appears in the above-identified patent and that said Letters Patent is hereby corrected as shown below:

COLUMN 137

Line 48, "according" should read --according to--.

COLUMN 143

Line 44, "base" (2nd occurrence) should read --data--.

Signed and Sealed this

Twentieth Day of July, 1999

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT NO.   : 5,812,944
DATED        : September 22, 1998
INVENTOR(S)  : Kouichi Matsumoto It is certified that error appears in the above-identified patent and that said Letters Patent is hereby corrected as shown below:

This certificate supersedes Certificate of Correction issued July 20, 1999, the number was erroneously mentioned and should be deleted since no Certificate of Correction was granted.

Signed and Sealed this

Seventh Day of September, 1999

Attest:

Q. TODD DICKINSON

*Attesting Officer*     *Acting Commissioner of Patents and Trademarks*